Dec. 16, 1958  S. T. WILLIAMS  2,864,426
TRUCK TUBELESS TIRE VALVE
Filed Jan. 20, 1956
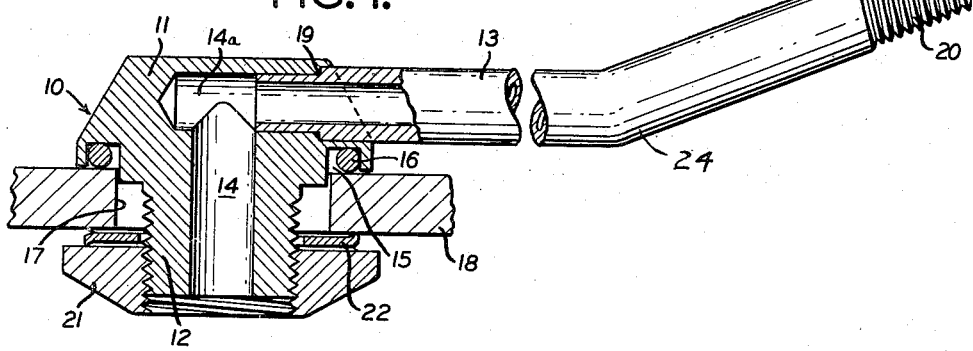
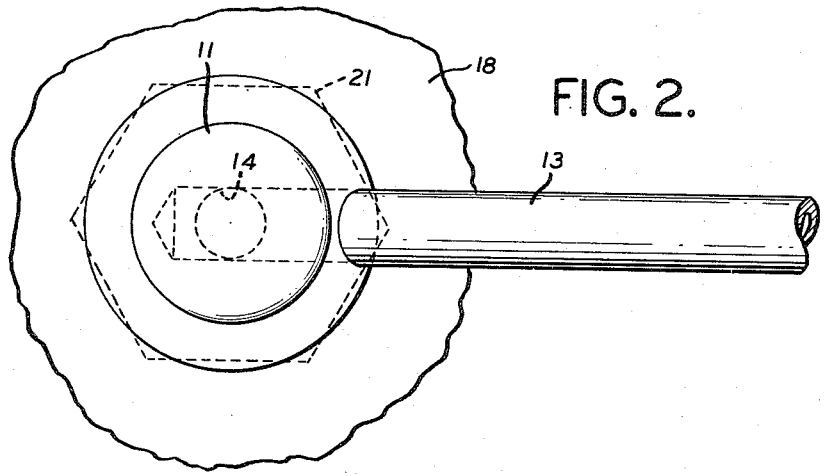
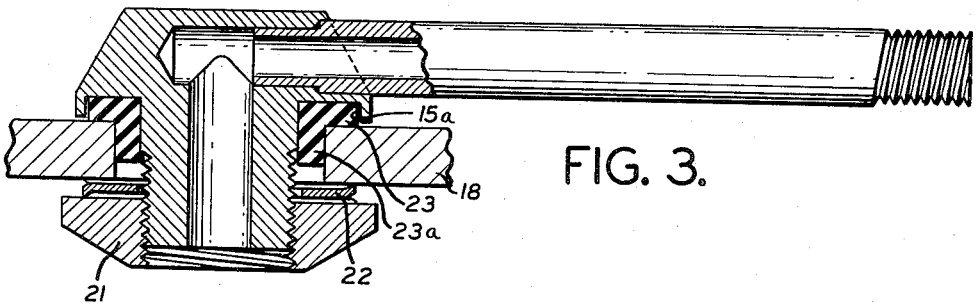
INVENTOR
SELDEN T. WILLIAMS.
BY
Churchill, Rich Weymouth Engel
ATTORNEYS.

United States Patent Office 2,864,426
Patented Dec. 16, 1958

2,864,426

TRUCK TUBELESS TIRE VALVE

Selden T. Williams, Bellerose, N. Y., assignor to Scovill Manufacturing Company, Waterbury, Conn., a specially chartered corporation of Connecticut Application January 20, 1956, Serial No. 560,325

4 Claims. (Cl. 152—427)

The present invention relates to valve stems for use in inflating tubeless tires, and more particularly to such valve stems intended for mounting on truck and bus tire rims.

Conventional truck and bus tire valve stems have a long stem and are made in a group of standard lengths adapted to be bent to meet substantially all truck and bus requirements. Such valve stems can be bent by the tire manufacturer or at service stations to correctly fit standard wheel and rim combinations on which the inner tube to which the valve stem is attached may be used. The stems are usually first bent at substantially a right angle in proximity to the base and then formed with a second bend between the first bend and the nipple end. These valve stems cannot be bent in production or in the field to produce a short enough portion adjacent the base to clear brake drums on certain truck applications and where such valve stems are to be used on tubeless tires, the problem of obtaining an air-tight seal with the wheel rim necessitates a still greater length of stem projecting through the rim. Thus, not only did the advent of the tubeless tire and its application to truck and bus rims leave the problem of reducing the length of the stem portion adjacent the base to clear the brake drum unsolved, but it also presented additional problems such as obtaining and maintaining a leak-tight seal between the valve stem and the rim and making such valve stem removable and replaceable in the event of damage thereto.

The present invention has for its object the solution of the problem of overcoming the difficulties heretofore encountered with valve stems intended for truck and bus tire rims, and more particularly to provide for such tire rims a valve stem, the length of the base end portion of which is reduced to a minimum whereby the necessity for making the first bend in the stem adjacent the base is eliminated.

The foregoing and other objects of the invention, not specifically enumerated, are accomplished by providing a valve stem which comprises a body portion formed with an enlarged base, a threaded shank, and a tubular extension extending laterally from the base, the enlarged base having in its underface an annular recess for accommodating an O-ring gasket or rubber grommet adapted to seat against a rim surface and a threaded nut for locking such stem body portion and gasket or grommet with a leak-tight seal to the rim. The invention will be readily understood from the detailed description which follows, when considered in connection with the accompanying drawings, wherein:

Figure 1 shows a diametrical section through a valve stem embodying the invention, a part of the stem extension being shown in elevation.

Fig. 2 is a top plan view of the valve stem shown in Fig. 1.

Fig. 3 is a view similar to Fig. 1, showing a modification.

Referring to the drawings, the valve stem consists of a body portion 10 having an enlarged disc-like base 11 from which axially extends an externally threaded shank 12 and from the peripheral wall of which base laterally extends a tubular stem extension 13. The body portion is formed with a passageway 14, 14a therethrough, the portion 14 extending through the shank 12 and the portion 14a extending into the base at substantially a right angle to the portion 14 and communicates with the bore of the tubular stem extension 13.

The enlarged base 11 may be of any preferred contour and is herein shown as the frustum of a cone formed on its under-face i. e., its face intended for engagement with the inner face of a tire rim 18 with an annular recess 15 adapted to receive an O-ring packing gasket 16 having a body diameter somewhat greater than the axial depth of the recess. The inner wall of the recess 15 extends outwardly beyond the outer wall and is of substantially the same magnitude as the hole 17 in a tire rim 18 to which the valve stem is to be connected, said inner wall being of somewhat larger diameter than the threaded shank 12.

The tubular stem extension 13 at its end whereat it is connected to the enlarged base does not project beyond the outer end of the base and is preferably reduced in external diameter to snugly fit within the passageway 14a within which it is permanently connected by being soldered thereto, as shown at 19. The opposite or free end of the stem extension is externally screw-threaded, as shown at 20, and is adapted to internally accommodate a conventional tire valve inside (not shown).

For mounting the valve stem on a rim there is provided a conventional hexagon nut 21 adapted to engage the threads on the shank 12, and a locking washer 22 having a resilient periphery is interposed between the hexagon nut and the rim to insure a firm, fluid-tight locking engagement of the stem onto the rim.

In the embodiment of the invention shown in Fig. 3, the general construction and arrangement of parts is substantially the same as that shown in Fig. 1 and primarily differs therefrom in that the annular recess 15a formed on the underside of the base has an inner diameter substantially less than the diameter of the hole in the rim and a rubber grommet 23 having an axial tubular portion 23a extends into the hole in the rim.

It will be seen from a consideration of the embodiments of the invention shown that the axial length of the body portion 10 can be reduced to a minimum by virtue of the fact that the stem extension 13 extends laterally from the side of the base portion, thereby eliminating the necessity of forming a bend in the valve stem adjacent the rim and the additional fact that the packing gasket is seated in an annular recess adjacent the rim. It will also be appreciated by virtue of the use of a locking washer in conjunction with the deformable O-ring or grommet that when the valve stem is locked onto a rim it will not become loosened or give rise to leakage due to vibration, which will be absorbed by the combination of the locking washer and the gasket. Of course, the tubular extension 13 may extend parallel to the axis of the rim, as shown in Fig. 3, or it may be bent intermediate its ends, as shown at 24, depending upon the type of wheel rim upon which the valve stem is to be mounted.

While there has been shown and described two preferred embodiments of the invention, it is to be understood the changes in details of construction and arrangement of parts may be made therein within the range of mechanical skill without departing from the spirit of the invention as hereinafter claimed.

What is claimed is:

1. A tubeless tire valve stem for removable attachment to a truck or bus tire rim, said valve stem comprising a body portion having an integral enlarged disc-like base one face of which is adapted engage the inner face of a rim, a threaded shank projecting axially from the base and adapted to project radially through a valve stem hole in a rim, and a tubular stem extension permanently connected directly to the base and extending laterally from the peripheral wall thereof, the body portion being formed with a passageway extending through the shank and base and communicating with the tubular extension, said enlarged disc-like base being formed on its face intended for engagement with the inner face of a rim with an annular recess concentric with the shank and housing a deformable gasket for engagement with said rim face, and locking means of larger diameter than the valve stem hole in a rim and incapable of passage therethrough to threadedly engage the shank when projected through the valve stem hole and seat against the opposite rim face for locking the body portion and deforming the gasket into engagement with the rim to provide a leak-tight seal therewith.

2. A valve stem according to claim 1 wherein the inner wall diameter of the annular recess in the base has the magnitude of the diameter of the hole in the rim and an axial length to engage within the rim hole.

3. A valve stem according to claim 1 wherein the inner wall diameter of the annular recess in the base is substantially equal to the shank diameter and smaller than the diameter of the hole in the rim.

4. A tire rim and valve stem assembly for a tubeless tire, said rim having a valve stem hole therein, said valve stem comprising a body portion having a disc-like base of larger diameter than said hole, a threaded shank extending axially from said base and projecting through said hole from the inner face of the rim outwardly, and a tubular stem extension permanently connected to and extending laterally from the peripheral wall of the base, said body portion being formed with a passageway extending through the shank and base and communicating with the tubular extension, said disc-like base being formed on its rim engaging side with an annular recess concentric with the shank and of larger diameter than the hole in the rim, a packing gasket within said recess, and locking means on the threaded shank engaging the tire face of the rim and holding the body portion locked to the rim and the gasket deformed in fluid-tight engagement with the rim.

References Cited in the file of this patent

UNITED STATES PATENTS

| | | |
|---|---|---|
| 596,701 | Griswold | Jan. 4, 1898 |
| 2,481,404 | Donner | Sept. 6, 1949 |
| 2,731,065 | Powers | Jan. 7, 1956 |
| 2,744,559 | Leonetti | May 8, 1956 |

FOREIGN PATENTS

| | | |
|---|---|---|
| 510,339 | Canada | Feb. 22, 1955 |
| 725,775 | Great Britain | Mar. 9, 1955 |
| 739,529 | Great Britain | Nov. 2, 1955 |